Dec. 10, 1946.          R. A. NELSON                2,412,416
                     COMPUTING APPARATUS
              Filed Sept. 6, 1945        8 Sheets-Sheet 1

Inventor:
Raymond A. Nelson
By Wallace and Cannon
Attorneys

Dec. 10, 1946  R. A. NELSON  2,412,416
COMPUTING APPARATUS
Filed Sept. 6, 1945  8 Sheets-Sheet 2

Inventor:
Raymond A. Nelson
By Wallace and Cannon
Attorney

Dec. 10, 1946.  R. A. NELSON  2,412,416
COMPUTING APPARATUS
Filed Sept. 6, 1945  8 Sheets-Sheet 3

INVENTOR
Raymond A. Nelson
By Wallace and Cannon
ATTORNEYS

Dec. 10, 1946.   R. A. NELSON   2,412,416
COMPUTING APPARATUS
Filed Sept. 6, 1945   8 Sheets-Sheet 4

INVENTOR
Raymond A. Nelson
BY Wallace and Cannon
ATTORNEYS:

Dec. 10, 1946. R. A. NELSON 2,412,416
COMPUTING APPARATUS
Filed Sept. 6, 1945 8 Sheets-Sheet 6

INVENTOR
Raymond A. Nelson
BY Wallace and Cannon
ATTORNEYS

Patented Dec. 10, 1946

2,412,416

UNITED STATES PATENT OFFICE 2,412,416

COMPUTING APPARATUS

Raymond A. Nelson, Deerfield, Ill.

Application September 6, 1945, Serial No. 614,783

11 Claims. (Cl. 235—87)

This invention relates to a computing apparatus especially designed for use by retail merchants and others in computing the selling price of a single article, or of a number of articles, or of a unit of merchandise at any percentage of profit which it may be desired to obtain upon a sale transaction, basing the percentage of profit either upon the desired selling price or the known cost of the merchandise, as may be desired, and, conversely, for computing the cost of a single article or unit of merchandise based upon a known selling price and percentage of profit. The primary object of the invention is to provide a novel and simple computing apparatus for the purposes specified.

Another object of the invention is to embody in the new computing apparatus a novel chart mounted upon a manually operable rotatable drum or cylinder and bearing both cost data and selling price data and adapted to be operated in such a manner as to enable the user to determine rapidly the selling price of a single article of merchandise or of a number of articles or units of merchandise, based upon a known cost, so as to afford in the transaction a pre-selected percentage of profit based on either the selling price or the cost of the merchandise and, conversely, to enable the user to determine the cost of a single article or unit of merchandise based upon a known percentage of profit.

An additional object of the invention is to provide a computing apparatus which is simple in construction and operation and which requires no special training or skill in the use thereof as is required in the use of slide rules and other computing and calculating devices heretofore used by retail merchants.

A further object of the invention is to provide a novel computing apparatus of the character and for the purposes herein set forth and in the use of which all of the significant data as to the cost of an article or unit of merchandise, and as to its selling price and as to the desired percentage of profit based on cost or selling price, involved in a sales transaction or in taking inventory, can be readily determined from a single setting or positioning of the rotatable data-bearing drum or cylinder which is embodied in the new computing apparatus coupled with a single reading of the several scales associated therewith.

An additional object of the invention is to construct and arrange the new computing device in such a manner that it may readily be employed by retail merchants in figuring inventories since in the use of the new computing device the cost of an article, or of a unit of merchandise, may readily be determined.

Other and further objects of the present invention will be apparent from the following description and claims and are illustrated in the accompanying drawings which, by way of illustration, show preferred embodiments of the invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

Figure 4:
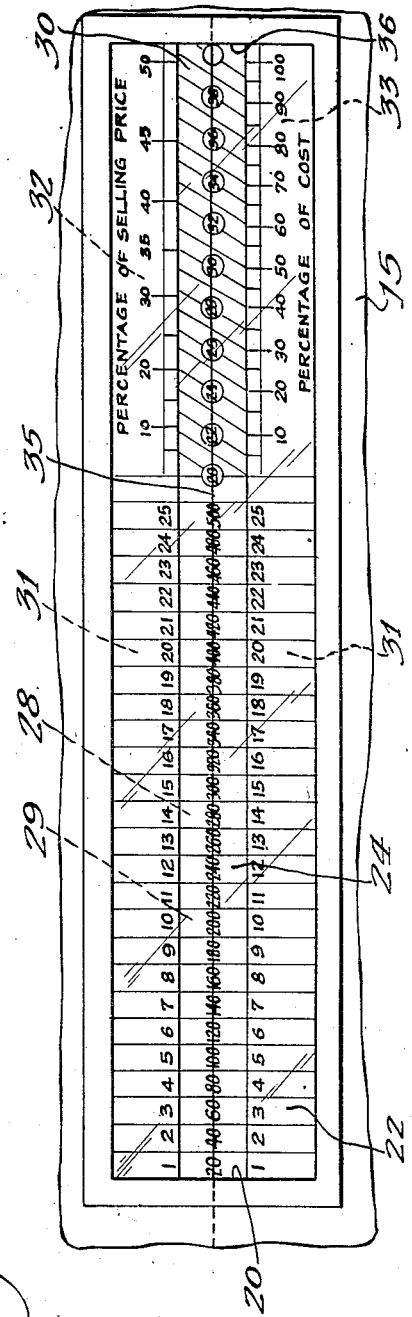
Figure 5:
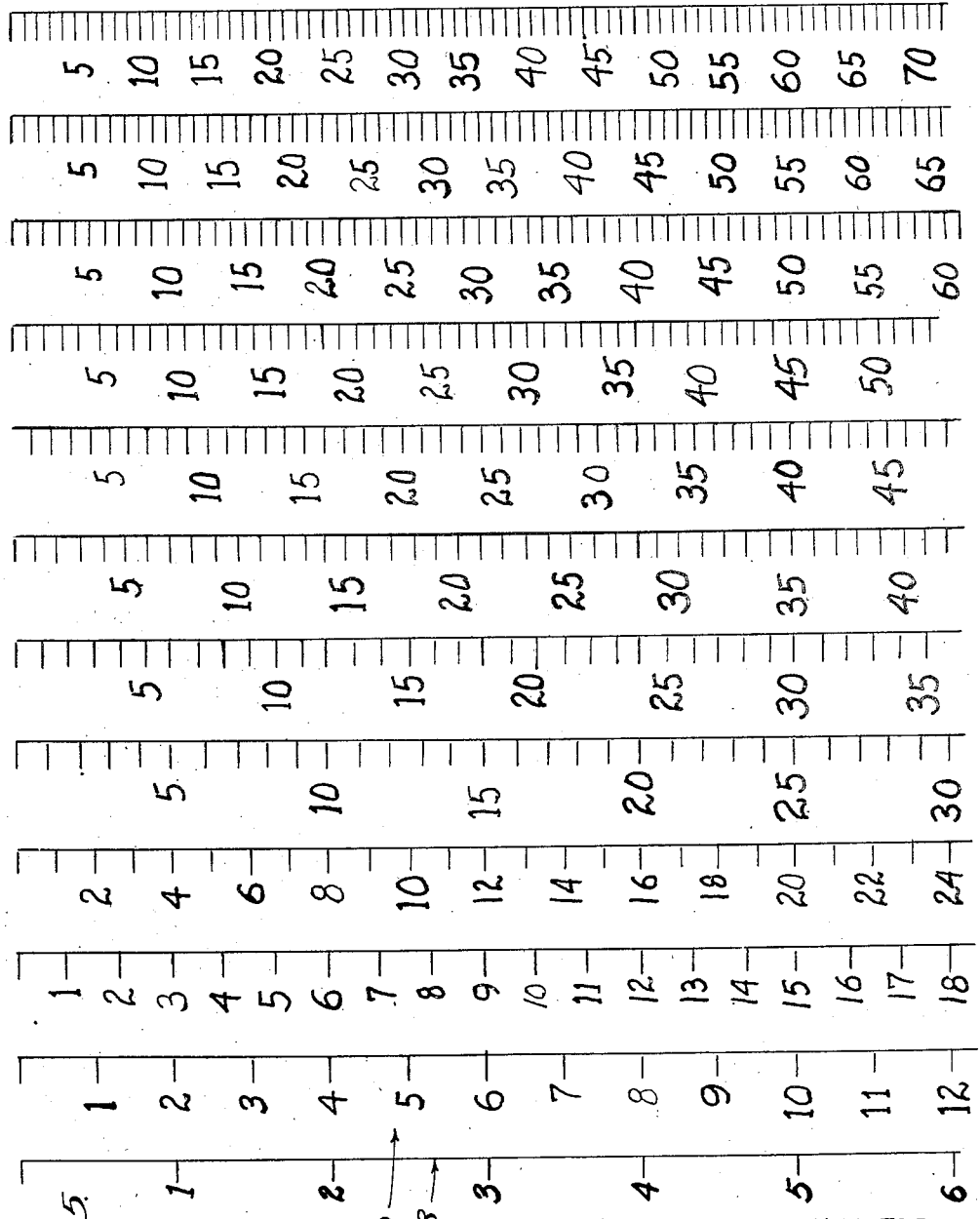
Figure 6:
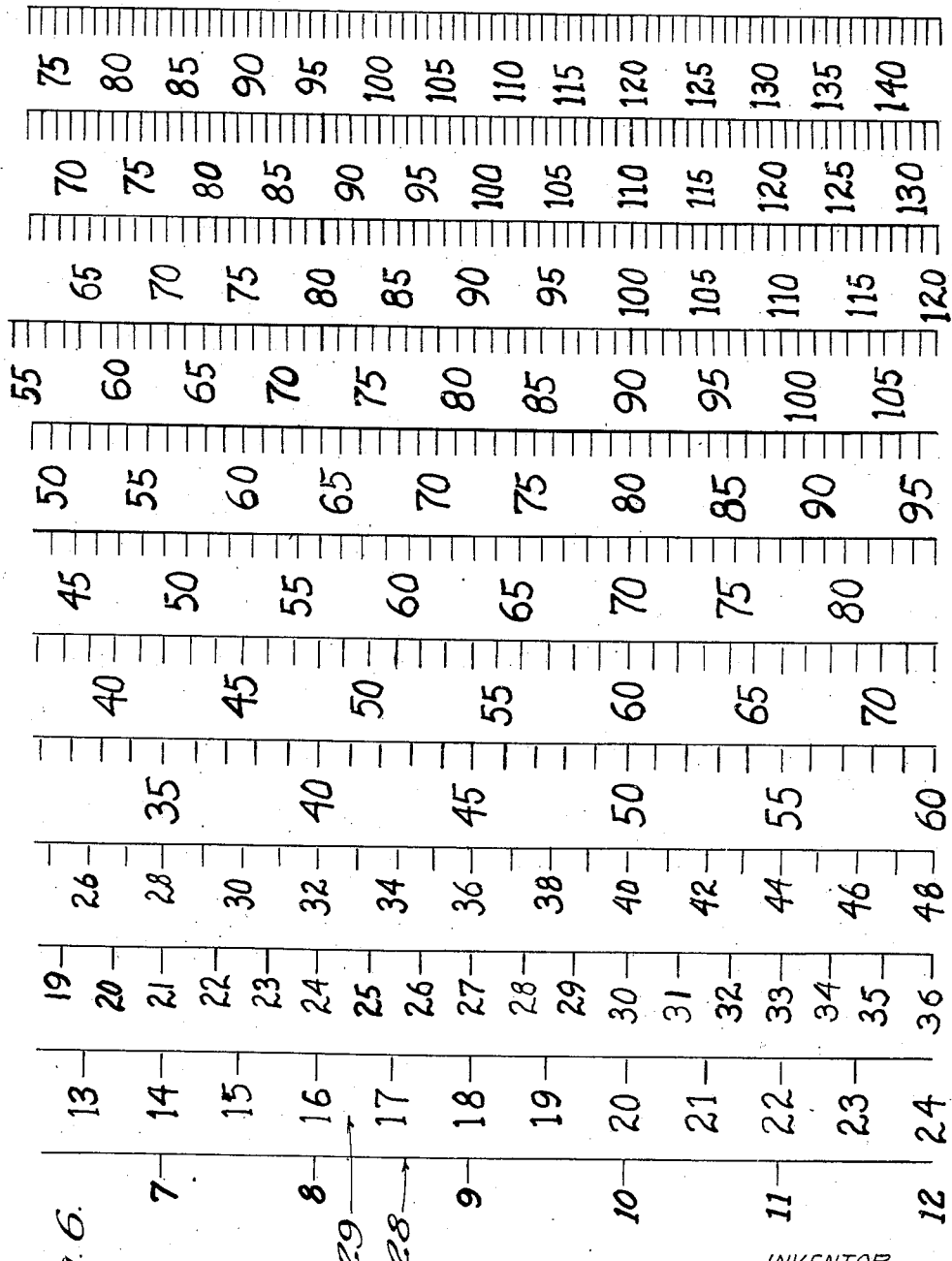
Figure 7:
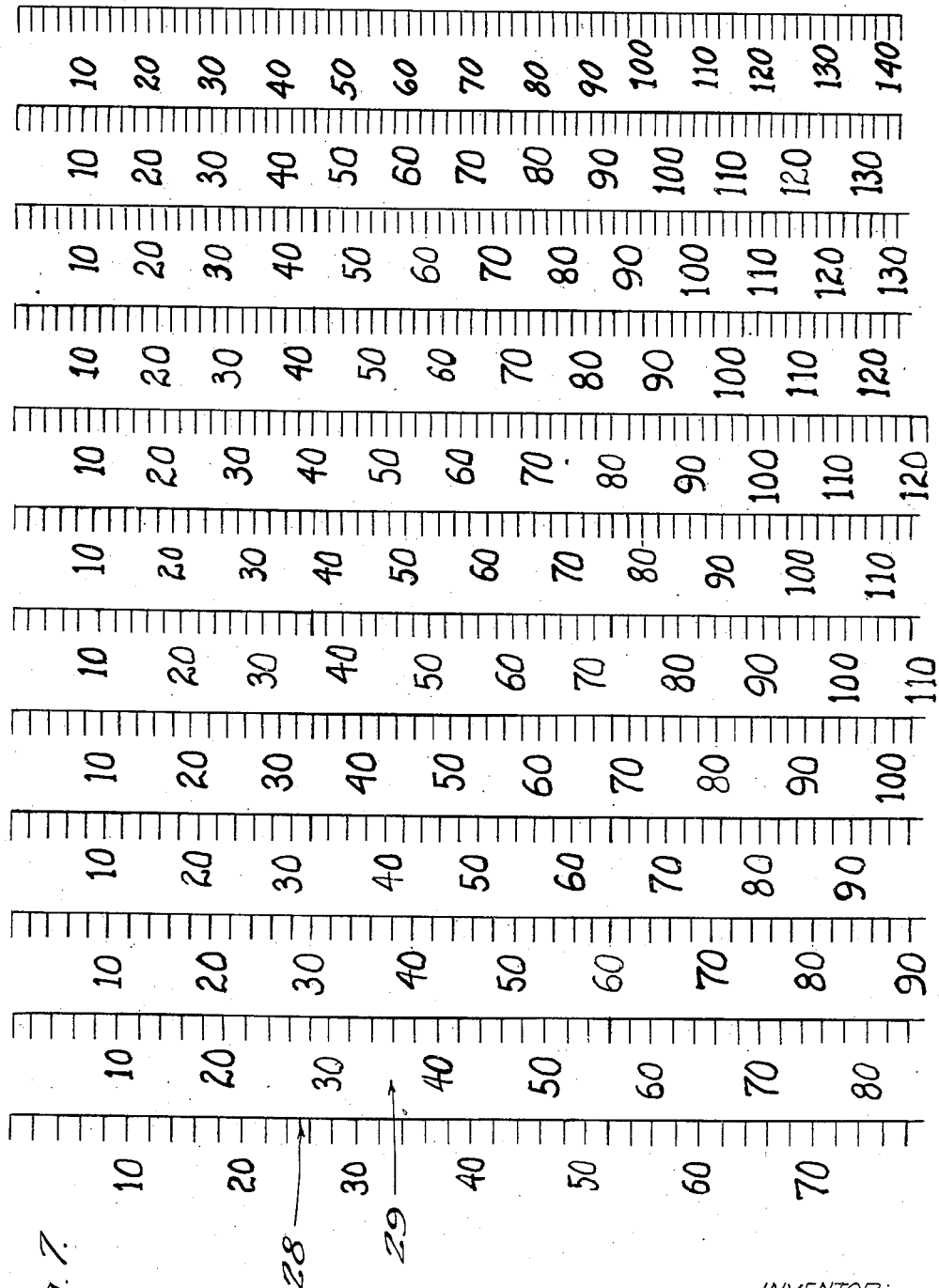
Figure 8:
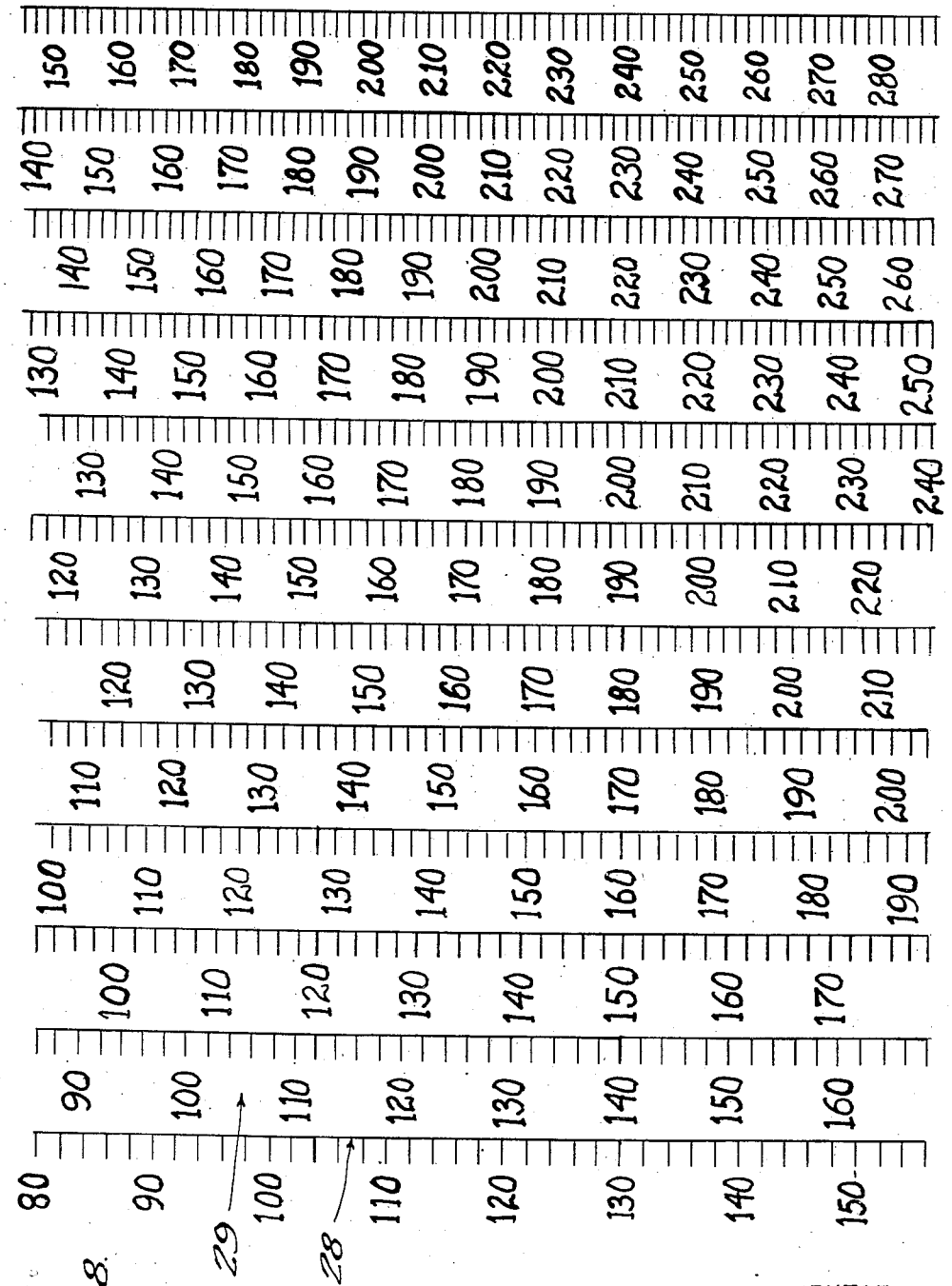
Figure 9:
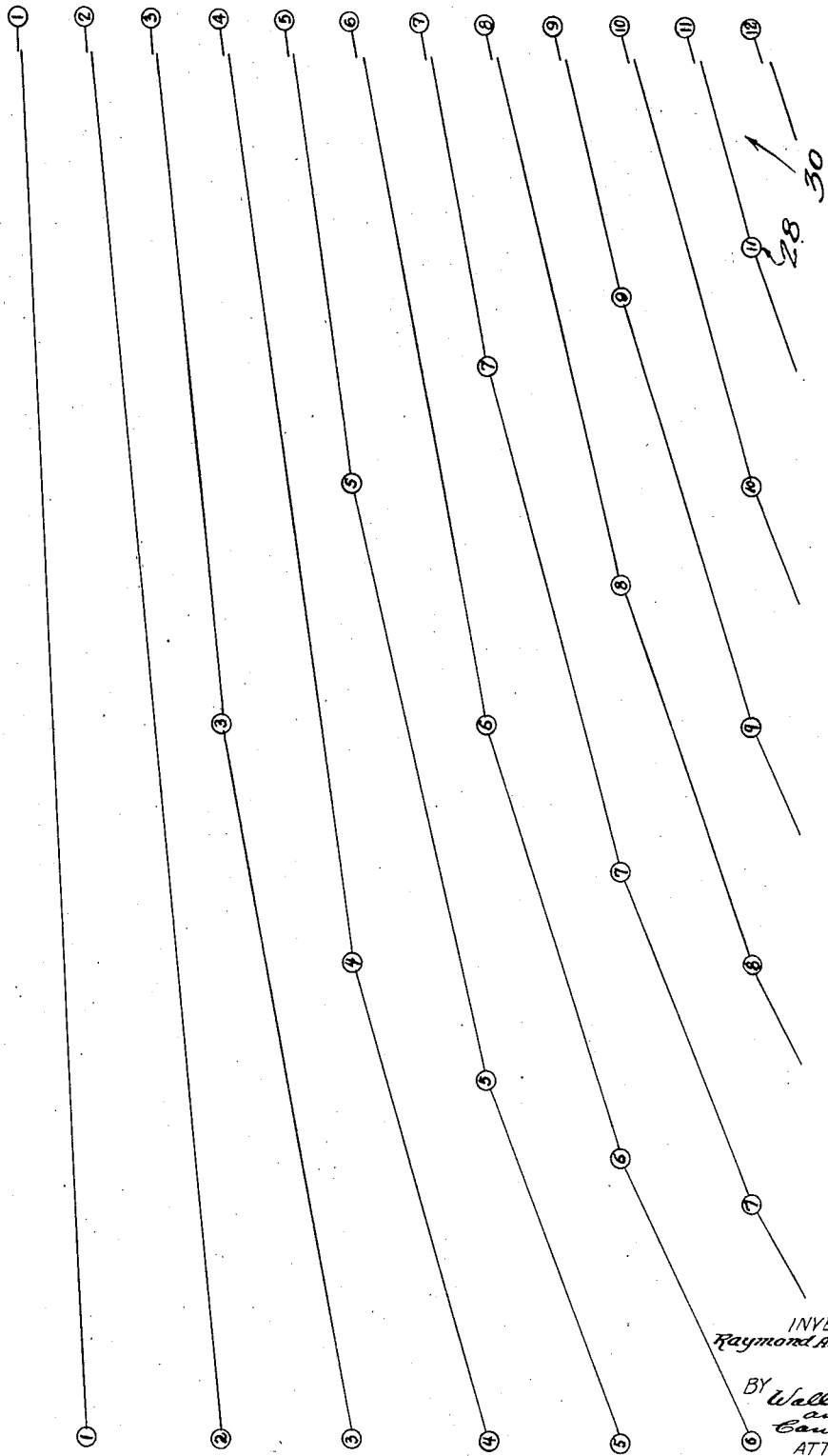
Figure 10:
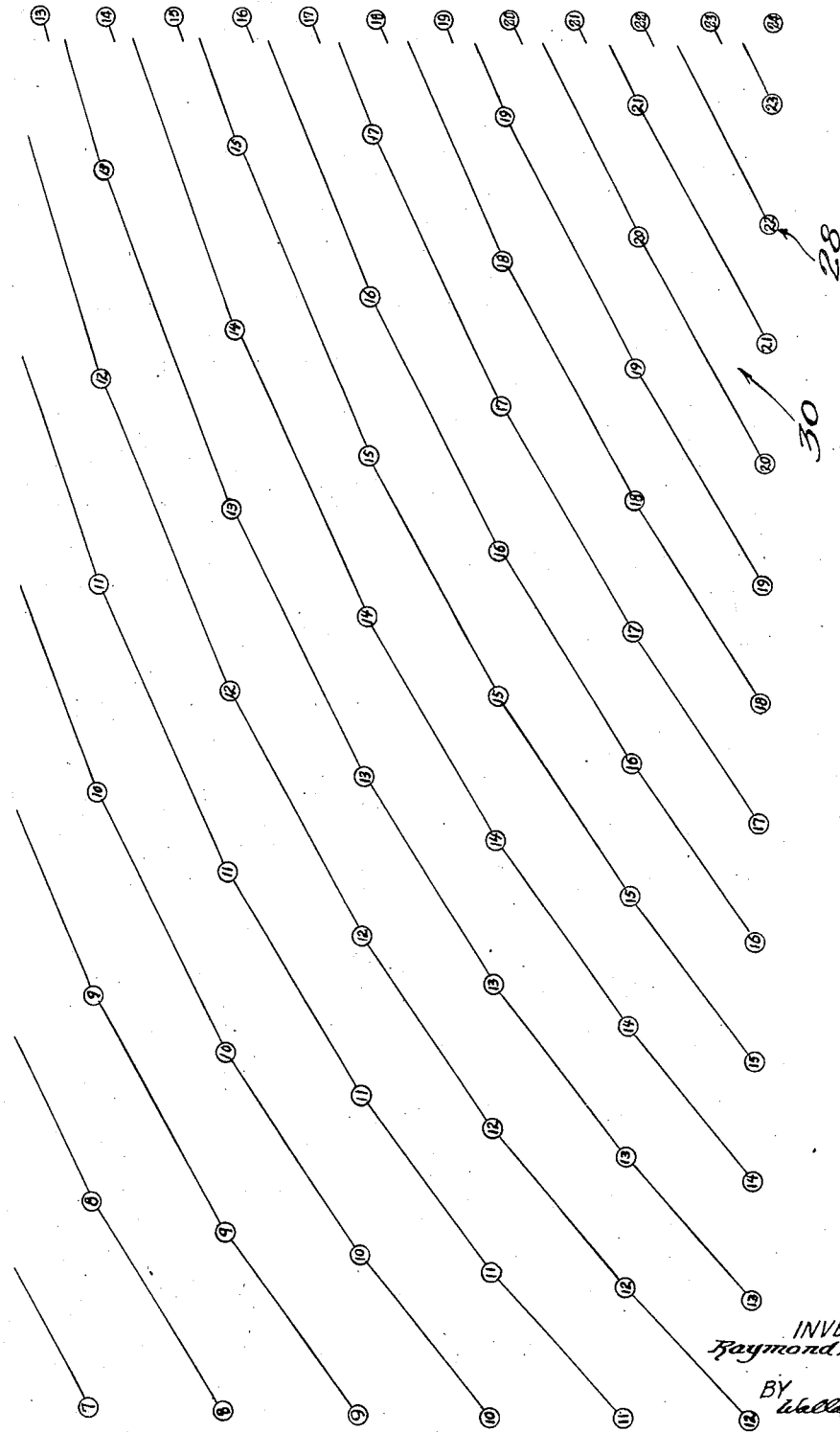

Fig. 4 is a fragmentary plan view of the new computing apparatus showing a portion of the chart on the manually operable drum or cylinder in registration with the sight opening provided in a wall of the housing in which the drum or cylinder is rotatably mounted and also showing the several scales or legends which are arranged along the sight opening in the housing for use in performing computing operations based upon the cost and selling price data which are arranged on the chart on the drum;

Fig. 5 is a fragmentary plan view illustrating the upper left-hand corner portion of the cost data section or left-hand section of the data-bearing chart mounted on the rotatable cylinder or drum as said chart is seen when printed flat upon a plane surface and prior to being assembled on the manually operable drum, and showing cost prices of different numbers of articles or units of merchandise and the relationship between the cost of a single article or a number of articles or a unit of merchandise and the cost of a larger number of articles or units of merchandise at the same cost price;

Fig. 6 is a fragmentary plan view illustrating another portion of the left-hand or cost data section of the chart mounted on the rotatable cylinder or drum, the cost prices in the various columns in this figure being continuations of those shown in the corresponding columns in Fig. 5, and being arranged below the cost data columns shown in Fig. 5 as the chart is seen when printed and laid flat upon a plane surface and prior to being mounted on the drum;

Fig. 7 is a fragmentary plan view illustrating another portion of the cost data bearing section of the data-bearing chart on the drum, this portion of the chart lying immediately to the right of the portion of the chart shown in Fig. 5 as the chart is seen when printed and laid flat upon a plane surface and prior to being mounted on the drum;

Fig. 8 is a fragmentary plan view illustrating another portion of the left-hand or cost data-bearing section of the chart, this portion of the chart lying immediately below the portion thereof shown in Fig. 7 and the cost data columns in this figure being continuations of those shown in the corresponding columns shown in Fig. 7;

Fig. 9 is a fragmentary plan view illustrating a portion of the right-hand section or selling price data-bearing section of the chart on the rotatable cylinder or drum, this portion of the selling price data-bearing or right-hand section of the chart lying in the upper portion of the right-hand section of the chart when the chart is printed and laid flat on a plane surface and prior to being mounted on the rotatable drum or cylinder; and Fig. 10 is a further fragmentary plan view of the right-hand or selling price data-bearing portion of the chart mounted on the drum or cylinder, the data shown in this figure being a continuation of the data shown in Fig. 9 and this portion of the chart being arranged immediately below the portion of the chart shown in Fig. 9 when the chart is printed flat upon a plane surface and prior to being mounted on the rotatable drum or cylinder.

A typical embodiment of the new computing apparatus is shown in the drawings and comprises a casing 10 which includes a rear wall 11, a front wall 12, side walls 13, a horizontal top wall portion 14, and an inclined face or top wall portion 15.

A drum or cylinder 16 is rotatably mounted in the housing or casing 10, upon a pair of axially aligned supporting shafts 18 which have their end portions journaled in suitable bearing openings 19 provided in the side walls 13 of the casing 10. These shafts 17 project into a tubular sleeve 19 which extends between the side walls 13 of the drum or cylinder at the central long axis thereof and the shafts 17 are keyed to the tubular sleeve 19, as at 34 (Fig. 3).

Figure 2:
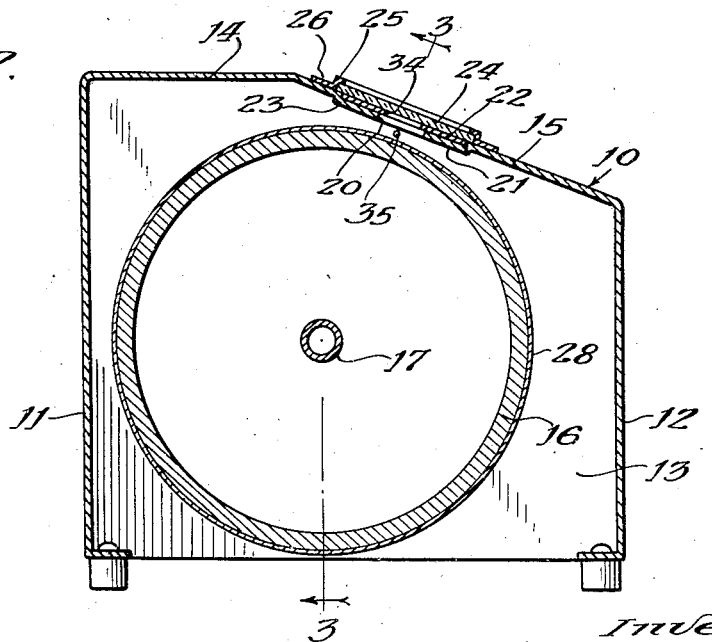
Fig. 2 is a transverse vertical sectional view on line 2—2 in Fig. 1.

The inclined front wall portion 15 of the casing 10 has an elongated sight opening 20 provided therein and extending from side to side thereof, this sight opening 20 being arranged in a depressed portion 21 of the inclined front wall 15 (Fig. 2). A legend-bearing card 22 is mounted in the depressed portion 21 of the inclined front wall 15, and within a pocket 23 formed therein, and a magnifying glass 24 is mounted over the legend-bearing card 22, the magnifying glass 24 and the card 22 being retained in position by means of a frame 25 suitably attached to the inclined front wall 15, as at 26. The legend-bearing card 22 is provided with an elongated slot or sight opening 24 which is disposed above and in registry with the sight opening 20 in the depressed portion 21 of the inclined front wall 15 (Fig. 2).

Figure 1:
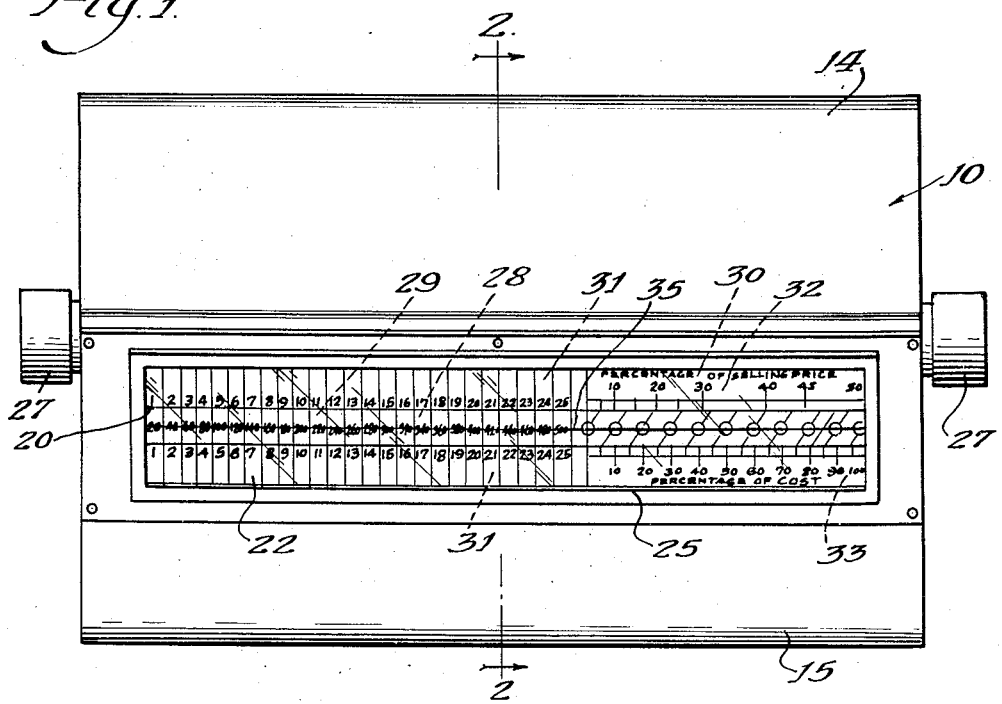
Fig. 1 is a top plan view illustrating a preferred embodiment of the new computing apparatus.

As shown in Figs. 1 and 4 the sight opening 20 is preferably divided lengthwise thereof by a divider line or so-called sight bar 35 which may be formed in any suitable manner as by being printed in the form of a black line on the magnifying glass 24.

Figure 3:
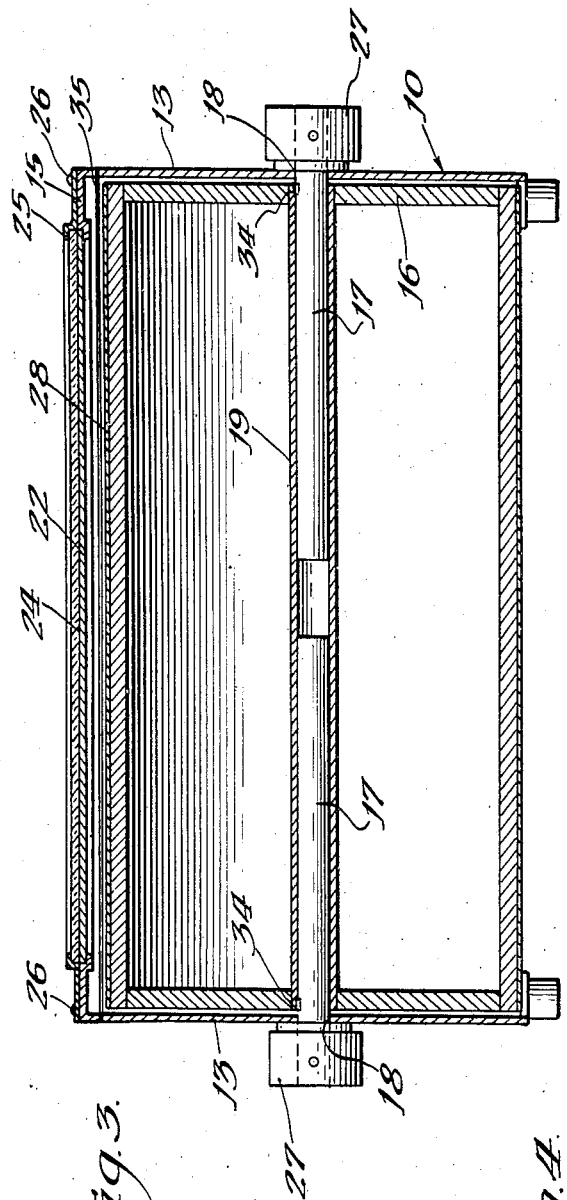
Fig. 3 is a vertical sectional view on line 3—3 in Fig. 2.

As shown in Figs. 1 and 3, the end portions 18 of the shaft 17 on which the drum 16 is mounted have hand knobs or handles 27 mounted thereon so that the drum or cylinder 16 may be manually rotated in the casing 10 relative to and past the sight opening 20, for reasons which will be made apparent hereinafter.

A printed legend-bearing sheet or chart 28 is mounted upon and encircles the drum 16 and may be attached thereto in any suitable manner, as by means of a suitable adhesive or the like.

The legend-bearing sheet or chart 28 on the drum 16 is divided into two sections 29 and 30, the section 29 being arranged at the left hand side of the sheet or chart 28 on the drum or cylinder 16, as seen through the sight opening 20, and the section 30 being arranged at the right side of the sheet or chart 28, as seen through the sight opening 20. In place of a single sheet or chart, as 28, divided into two sections two separate sheets or charts may, of course, be used.

A legend or scale 31 is printed or otherwise inscribed on the card 22, below the magnifying glass 24, in the left-hand portion of the card 22 (Fig. 4). A second legend or scale 32 is printed on the card 22 above and along the upper edge of the right-hand portion of the sight opening 20; and a third legend or scale 33 is printed on the card 22 below the sight opening 20, and along the right-hand end portion of the sight opening 20. As will be explained hereinafter, the legend 31 is designed for use with the cost price data or indicia on the left-hand section 29 of the sheet or chart 28 on the drum 16, whereas the legends or scales 32 and 33 are designed for use with the selling price data or indicia printed on the right-hand side of the card or chart 28 which is mounted on the drum 16.

As shown in Figs. 1 and 4, the legend 31 is in the form of numerals or numbered spaces or divisions from 1 to 25, inclusive, whereas the legend or scale 32 is in the form of numerals or numbered spaces or divisions representing percentages of profit based on selling price, and the legend 33 is in the form of numerals or numbered spaces or divisions representing percentages of profit based on cost prices.

Fragmentary portions of the left-hand or cost price data-bearing section 29 of the sheet or chart 28 on the drum 16 are illustrated in Figs. 5, 6, 7 and 8 of the drawings and these will now be described.

Thus by reference to Fig. 5, it will be noted that the left-hand column in this figure shows cost prices of articles of merchandise, or units of merchandise, expressed in monetary values in terms of cents from 1 to 6 and the next column to the right shows cost prices in terms of cents from 1 to 12. Thus each space in the second column from the left in Fig. 5 represents a cost price which is a multiple of a cost price shown in the left-hand column. Similarly, the third and fourth columns from the left in Fig. 5 represent cost prices in terms of cents from 1 to 18 and from 2 to 24, respectively. Likewise, the remaining columns shown in Fig. 5 represent cost prices of articles or units of merchandise in terms of cents expressed in decimal units. The portion of the left-hand or cost data-bearing section 29 of the chart 28 lies in the upper left-hand corner thereof as the chart 28 is seen when printed and laid flat upon a plane surface and prior to being mounted on the drum 16.

Fig. 6 is another fragmentary plan view of the left-hand or cost price data-bearing section 29 of the chart 28 and the columns shown in this figure are extensions or continuations of the columns shown in Fig. 5 and lie immediately below the columns shown in Fig. 5 when the chart 28 is printed and laid flat upon a plane surface and prior to being mounted on the drum 16.

Similarly, Fig. 7 is a further fragmentary plan view of the left-hand or cost price data-bearing section 29 of the chart and the numerals shown in the columns in this figure represent cost prices of articles or units of merchandise in terms of monetary values or cents expressed in decimal units. The portion of the left-hand or cost price data section 29 of the chart 28 which is shown in Fig. 7 lies immediately to the right of that portion of the chart 28 which is shown in Fig. 5 when the chart 28 is printed and laid flat on a plane surface and prior to being mounted in the drum 16.

Fig. 8 is a further fragmentary plan view of the cost-price data-bearing or left-hand section 29 of the chart 28 and the cost price data and columns shown in this figure are extensions or constructions of the cost price data and columns shown in Fig. 7. The portion of the chart 28 which is illustrated in Fig. 8 lies immediately below the portion of the chart 28 shown in Fig. 7 when the chart is printed and laid flat upon a plane surface and prior to being mounted on the drum 16.

Fig. 9 is a fragmentary plan view illustrating a portion of the right-hand or selling price data-bearing section 30 of the chart 28 and this portion of the chart lies in the upper portion of the right-hand or selling price data-bearing section 30 thereof when the chart 28 is printed and laid flat upon a plane surface and prior to being mounted on the drum 16.

By reference to Fig. 9, it will be seen that the numerals in the left-hand column of this figure represent various cost prices of an article or a number of articles or units of merchandise expressed in terms of monetary values, namely, cents, the space between each two successive numerals representing one cent of monetary value. It will be noted, therefore, that the spaces between the numerals in the left-hand column of Fig. 9 correspond exactly to the cost prices shown in the left-hand column of Fig. 5.

Similarly, Fig. 10 is a fragmentary plan view showing another portion of the right-hand or selling-price data section of the chart 28. By reference to Fig. 10, it will be noted that the left-hand column of numerals in this figure correspond to the cost-prices shown in the left-hand column of Fig. 6 and represent cost prices of an article or articles or units of merchandise expressed in terms of monetary values, namely, cents from 7 to 12. That portion of the chart 28 which is illustrated in Fig. 9 when the chart 28 is printed and laid flat upon a plane surface and prior to being mounted on the drum 16.

The cost-price data shown in Figs. 5, 6, 7 and 8 and the selling-price data shown in Figs. 9 and 10 represent only a portion of the chart 28 and the data printed thereon, but both the cost-price data-bearing section or left-hand section 29 and the selling-price data-bearing section or right-hand section 30 of the chart 28 may be, and in the use of the new computing device are, extended or continued to larger values following the same general plan and arrangement shown in these fragmentary views (Figs. 5 to 10, inclusive).

The oblique lines shown in Figs. 9 and 10 represent selling prices of articles or units of merchandise but each of these oblique lines has its point of origin at the left end thereof at a point which represents the cost price of an article or of a number of articles. Hence the space between each two oblique lines represents a monetary value of one cent but every point on each of the oblique lines represents a selling price. Thus, for example, every point on the uppermost oblique line shown in Fig. 9, and which has its origin at "1," represents a selling price of one cent and any and every point on this uppermost oblique line in Fig. 9 which may be brought into registration with the right-hand portion of the sight opening 20—24, and into registration with a point on the "Percentage of selling price" legend or scale 32, and into registration with a point on the "Percentage of cost" legend or scale 33 will indicate the selling price of an article or unit of merchandise to be sold at a specified profit based on a percentage of selling price or on a percentage of cost, respectively.

It will be noted, in this connection, that the horizontal distance across the right-hand section or selling price data-bearing section 30 of the chart 28 on the drum 16 represents a selling price of an article or a number of articles at a mark-up of 100 per cent of cost price. Thus, for example, if the numeral "1" which is disposed at the point of origin of the uppermost oblique line in Fig. 9 is disposed in registry with the right-hand portion of the sight opening 20—24, and under the sight line or bar 35, the numeral "1" in the left-hand column of Fig. 5 will also be disposed in registration with the sight opening 20—24 at the left-hand end thereof, and under the sight line or bar 35, and in registry with the vertical column numbered "1" on the legend or scale 22. When the chart 28 on the drum is so positioned, with reference to the sight opening 20—24, the numeral "2" at the top of the right hand column in Fig. 9 will then also be disposed in registry with the sight opening 20—24, and under the sight line or bar 35, and in registry with the vertical line 36 which marks the right-hand end of the "Percentage of selling price" scale or legend 32, and the right-hand end of the "Percentage of cost" legend or scale 33, as shown in Fig. 4. Thus the new computing apparatus will show that the selling price of one article or unit of merchandise having a cost price of 1 cent but to be sold at a selling price which represents a mark-up of 100 per cent of its cost (1 cent) is 2 cents. Hence it will be seen that the terminus of an imaginary horizontal line drawn from the point of origin of each oblique line in the right-hand or selling price data-bearing section 30 of the chart 28 is at a point which represents a selling price which is based upon a mark-up of 100 per cent of the cost price of the article as represented by the point of origin of the same oblique selling price line.

It will be noted, however, that each oblique line in the right-hand or selling price data-bearing section 30 of the chart 28 maintains the same cents or other monetary value throughout its entire length and that at no time during the operation of the new apparatus does a given point on any one of the oblique lines have any other relationship to another given point on the same oblique line.

It will further be noted, in this connection, that the "Percentage of cost" scale 33 and the "Percentage of selling price" scale 32 are coextensive in length and are coextensive with the horizontal distance across the right-hand section or selling price data-bearing section 30 of the chart 28 from an imaginary line drawn through the points of origin of the oblique selling price lines at the left-hand marginal edge of the right-hand section 30 of the chart 28 to an imaginary line drawn through the termini of the oblique selling price lines along the right-hand marginal edge of the right-hand section 30 of the chart 28. However, the fragmentary views represented by Figs. 9 and 10, like those shown in Figs. 5, 6, 7 and 8, are shown on an enlarged scale relative to the sight opening 20—24 and the scales 31—32—33 associated therewith in order better to illustrate the left-hand or cost data-bearing section 29 and the right-hand or selling price data-bearing section 30 of the chart 28 on the drum 16.

It will be further noted, for example, that the horizontal distance from the numeral "5" in the left-hand marginal edge of Fig. 9 to the numeral "10" in the right-hand marginal edge of the same figure (representing a selling price of 10 cents on an article or unit of merchandise having a cost price of 5 cents but to be sold at a mark-up of 100 per cent of cost) is divided into five equal spaces numbered, respectively, 6, 7, 8, 9 and 10. Thus, for example, the space between the numeral "5" in the left-hand column of Fig. 9 and the numeral "6" horizontally to the right thereof represents a mark-up of one cent or 20 per cent of the cost of an article having a cost price of 5 cents so that the selling price of such an article will be 6 cents which is represented by the numeral 6 which is located on the oblique selling price line "6" immediately and horizontally to the right of the numeral "5" in the left-hand marginal edge of Fig. 9. The horizontal distances across the right-hand section 30 of the chart 28 from each of the succeeding points in the left-hand marginal edge thereof are similarly subdivided into such spaces each representing a mark-up or percentage of profit based on cost. Thus, the horizontal distance across the right-hand section 30 of the chart 28 from the numeral "10" in the left-hand marginal edge of Fig. 10 is divided into 10 spaces each representing a mark-up of one cent or 10 per cent, and so on.

In the use of the new computing apparatus the oblique lines shown in Figs. 9 and 10 are particularly helpful in enabling the user of the new computing apparatus quickly and accurately to compute the selling price of an article which happens to be a fraction of a cent. Thus, when the selling price of an article (which is to be sold at a predetermined percentage of profit based on selling price, as shown on the legend or scale 32 or at a predetermined percentage of cost as shown on the legend or scale 33) falls between two of the oblique lines in the right-hand portion 30 of the chart 28, as seen through the sight opening 20—24, the user of the apparatus may readily calculate the selling price at which the article must be sold, in terms of the nearest full cent, as represented by the nearest oblique line. This procedure is, of course, made necessary by reason of the fact that under our monetary system there are no coins representing values lower than one cent. This is likewise the reason why in the right-hand section 30 of the chart 28 the vertical space or distance between each two adjacent oblique lines represents a full cent of monetary value and there are no oblique lines subdividing such spaces since these would have no utility in our monetary system which lacks coins smaller than a cent in value. However, in other monetary systems with which the new computing apparatus may be used additional oblique lines could be and would be provided in the selling price data-bearing or right-hand section 30 of the chart 28 so as to represent selling prices involving fractional coins.

While the operation of the new computing apparatus will readily be understood from the foregoing description, considered in conjunction with the accompanying drawings, a further illustration of a typical use thereof will now be given.

Thus, for example, assuming that the user of the new computing apparatus or device in a retail grocery or other retail store desires to calculate the selling price of a single article of merchandise which costs $2.40 per dozen: In this instance he will then rotate the drum 16 by manipulating the handles or knobs 27 so that the numeral "240" in the left-hand or cost data-bearing section 29 of the chart 28 on the drum 16 appears under the sight line 35 in the sight opening 20—24 in the vertical column numbered "12" on the legend or scale 22 which is printed on the left-hand or cost data-bearing section of the card 22 (Figs. 1 and 4). He will then look along the sight opening 20 to the left-hand column "1" and will thereupon find that a single article of merchandise costing $2.40 per dozen will cost 20 cents per single article or unit, and similarly, forty cents for two articles or units, as shown in column 2, and so on.

Assuming further, in the foregoing example, that the user of the new computing device desires to calculate the selling price of a single article or unit of merchandise costing $2.40 per dozen or 20 cents per article and that he desires to sell such merchandise at a mark-up or profit of 25 per cent of cost or 20 per cent of selling price: He will then refer to the right-hand or selling price data-bearing section 28 of the chart 30 on the drum 16 whereupon he will find that an imaginary vertical line drawn across the sight opening 20 from the numeral or numbered line on the "Percentage of selling price" scale 32 which represents 20 per cent to the numbered line on the "Percentage of cost" scale 33 which represents 25 per cent of the selling price (Figs. 1 and 4), will intersect the oblique selling price line numbered 25. He will thus be informed that the selling price of such an article based on a mark-up or profit of 25 per cent of cost or 20 per cent of selling price will be 25 cents per article and this information will appear on that particular oblique line in the right-hand section 30 of the chart 28 which is bisected in the sight opening 20 by the aforesaid imaginary line between the numbered line 20 on the "Percentage of selling price" scale 32 and the numbered line 25 on the "Percentage of cost" scale 33.

Thus it will readily be seen that the new computing apparatus renders itself to use in retail and like stores in ascertaining the selling price of various articles or units of merchandise in the sale of which it is desired to yield a predetermined percentage of profit based either on a percentage of cost price or a percentage of selling price.

As pointed out hereinbefore, if the aforesaid imaginary vertical line drawn across the sight opening 20—24 between the numeral or numbered line on the "Percentage of selling price" scale 32 and the numeral or numbered line on the "Percentage of cost" scale 33 happens to fall between two of the oblique lines on the right-hand section 30 of the chart 28, thereby indicating that the selling price of the article in question (and which is to be sold at a preselected percentage of profit based on cost or on selling price) involves a fraction of a cent, the user of the new computing apparatus will then determine the selling price of the article by ascertaining the nearest oblique line and which will then represent the selling price of the article or unit of merchandise in terms of the nearest cent.

The new computing apparatus may also be used in figuring inventories of merchandise at a cost price. Thus, for example, assuming that a merchant using the new apparatus in figuring his inventory finds that he has 14 cans of corn on hand which cost $1.50 per dozen as shown by his invoices or by his so-called cost sheets, and he wishes to ascertain the inventory or cost value of the 14 cans of corn on hand. In this event he will rotate the drum 16 until the numeral 150 (representing $1.50) comes into registration with the sight line 35 in the sight opening 20—24 in numbered column 12 on the scale 31 and he will read over to the left-hand column numbered "1" on scale 31 whereupon he will ascertain that the cost price and inventory value of each can of corn will be 12.5 cents. By then reading along scale 31 to numbered column 14 he will ascertain that 14 cans of corn at 12.5 cents cost price will have an inventory value of 14×12.5 or $1.75.

Thus it will also be seen that the new computing apparatus readily lends itself to use in retail stores and the like calculating inventories, since retail and like inventories are now customarily based on the cost of the merchandise of which inventory is being taken, rather than on market price, in view of present day governmental regulations.

The relationships which exist between the various markings on the "Percentage of selling price" scale 32 and the markings on the "Percentage of cost" scale 33 (Figs. 1 and 4) are illustrated in the following columns which contain the data employed in plotting the scales 32 and 33:

| Percentage of selling price | Percentage of cost |
|---|---|
| 0.05 | 0.0526 |
| .06 | .0638 |
| .07 | .0752 |
| .08 | .0869 |
| .09 | .0989 |
| .10 | .1111 |
| .11 | .1235 |
| .12 | .1363 |
| .13 | .1494 |
| .14 | .1627 |
| .15 | .1764 |
| .16 | .1904 |
| .17 | .2048 |
| .18 | .2194 |
| .19 | .2345 |
| .20 | .2500 |
| .21 | .2658 |
| .22 | .2820 |
| .23 | .2987 |
| .24 | .3157 |
| .25 | .3333 |
| .26 | .3513 |
| .27 | .3698 |
| .28 | .3888 |
| .29 | .4084 |
| .30 | .4285 |
| .31 | .4492 |
| .32 | .4705 |
| .33 | .4925 |
| .34 | .5151 |
| .35 | .5384 |
| .36 | .5625 |
| .37 | .5873 |
| .38 | .6129 |
| .39 | .6393 |
| .40 | .6666 |
| .41 | .6949 |
| .42 | .7241 |
| .43 | .7543 |
| .44 | .7857 |
| .45 | .8181 |
| .46 | .8518 |
| .47 | .8868 |
| .48 | .9230 |
| .49 | .9607 |
| .50 | 1.0000 |

It will be noted that in the use of the new computing apparatus all of the significant data as to the cost price, percentage of profit based on selling price or on cost, and the selling price, which are involved in any sales transaction, or in the taking of inventory, are made available to the user of the new computing apparatus at and by means of a single setting or positioning of the drum 16 and the chart 28 thereon.

It will thus be seen from the foregoing description, considered in conjunction with the accompanying drawings, that the present invention provides a novel computing apparatus having the desirable advantages and characteristics, and accomplishing its intended object, including those hereinbefore pointed out and others which are inherent in the invention.

I claim:

1. A computing apparatus comprising a casing having a manually adjustable cylinder rotatably mounted therein, a chart on the said cylinder including a left-hand section bearing cost price data and the said cost price data being arranged in parallel columns containing numerical data representing cost prices of articles or units of merchandise, said chart including a right-hand section bearing selling price data, the said selling price data-bearing section of said chart being divided by oblique lines each representing the selling price of an article or unit of merchandise into spaces each representing a unit of monetary value, each of the said oblique selling price lines having its point of origin along the left-hand marginal edge of the said right-hand section of the said chart and the point of origin of each of the said oblique selling price lines representing the cost price of an article or unit of merchandise as shown in the left-hand column of the said left-hand or cost data-bearing section of the said chart, the said casing including a wall having an elongated sight opening therein and the said sight opening having substantially parallel upper and lower marginal edges, said sight opening including a left-hand portion having a scale along at least one of its marginal edges bearing indicia representing numbers of articles or units of merchandise, the said sight opening including a right-hand portion having a scale along one marginal edge bearing indicia representing percentages of profit based on the selling price of said articles or units of merchandise, the said right-hand portion of the said sight opening having a scale along its other marginal edge bearing indicia representing percentages of profit based on the cost of said articles or units of merchandise, the said percentage of profit based on cost scale corresponding in length to the horizontal distance across the said right-hand or selling price data-bearing section of the said chart from an imaginary line drawn through the point of origin of the said oblique selling price lines to an imaginary line drawn through the termini of the said oblique selling price lines along the right-hand marginal edge of the right-hand section of said chart, the horizontal distance across the right-hand section of the said chart from the point of origin of each of said oblique lines to the said right-hand marginal edge of the said right-hand section of the said chart representing a mark-up of 100 per cent of the cost of an article or unit of merchandise based on its cost price, every point on each of the said oblique selling price lines representing the selling price of an article or unit of merchandise, the vertical distance between the termini of each two adjacent oblique selling price lines being one-half of the distance between the points of origin of the same two adjacent lines, and means for manually rotating the said cylinder so as to move the said cost price data and the said selling price data on the said chart thereon selectively into registration with the said sight opening and into registration with the said scales arranged along the said marginal edges of the said sight opening.

2. A computing apparatus as defined in claim 1 in which the said percentage of profit based on selling price scale is arranged along the upper marginal edge of the said right-hand section of the said sight opening and in which the said percentage of profit based on cost scale is arranged along the lower marginal edge of the said right-hand portion of the said sight opening.

3. A computing apparatus as defined in claim 1 in which the said percentage of profit based on selling price scale is arranged along the upper marginal edge of the said right-hand section of the said sight opening and in which the said percentage of profit based on cost scale is arranged along the lower marginal edge of the said right-hand portion of the said sight opening, and in which the said percentage of profit based on selling price scale and the said percentage of profit based on cost scale are coextensive in length.

4. A computing apparatus as defined in claim 1 in which the said percentage of profit based on selling price scale and the said percentage of profit based on cost scales are coextensive in length.

5. A computing apparatus as defined in claim 1 and in which each of the said oblique selling price lines extends obliquely upwardly and to the right from its point of origin to its terminus as the said right-hand or selling price data-bearing section of the said chart would be seen if laid flat upon a plane surface.

6. A computing apparatus as defined in claim 1 in which the said percentage of profit based on selling price scale is arranged along the upper marginal edge of the said right-hand section of the said sight opening and in which the said percentage of profit based on cost scale is arranged along the lower marginal edge of the said right-hand portion of the said sight opening, and in which the said percentage of profit based on selling price scale and the said percentage of profit based on cost scale are coextensive in length and in which each of the said oblique selling price lines extends obliquely upwardly and to the right from its point of origin to its terminus as the said right-hand or selling price data-bearing section of the said chart would be seen if flat upon a plane surface.

7. A computing apparatus comprising a casing including a wall having a sight opening therein, a manually operable cylinder rotatably mounted in the said casing and having thereon a printed chart including a cost price data-bearing section bearing columnar numerical indicia representing the cost prices of various articles or units of merchandise, a scale arranged on the said casing along a marginal edge of the said sight opening and extending across the said cost price data-bearing section of the said chart and bearing numerical indicia representing numbers of articles or units of merchandise to be sold at the cost prices represented by the said columnar numerical indicia, said chart including a selling price data-bearing section having thereon lines representing selling price indicia, each of said lines having its origin at a point along a marginal edge of the said selling price data-bearing section of said chart representing the cost price of an article or unit of merchandise and each of said lines having its terminus at a point along a marginal edge of the said selling price data-bearing section of the said chart opposite but substantially parallel to the said first-named marginal edge of the said selling price data-bearing section of the said chart and at a point thereon which represents a selling price based on a mark-up of one hundred per cent of the cost of said article, said casing having a pair of coextensive percentage of profit scales arranged in opposite edges of the said sight opening and extending across the said selling price data-bearing section of the said chart, one of the said percentage of profit scales bearing numerical indicia based on the cost price of an article or unit of merchandise and the other one of said percentage of profit scales bearing numerical indicia based on the selling price of said article or unit of merchandise, and means for manually rotating the said cylinder so as to move the cost price data and the said selling price data thereon into registration with said sight opening.

8. A computing apparatus as defined in claim 7 in which each of said selling price indicia lines extends obliquely upwardly from its point of origin to its terminus as seen if said chart were laid upon a plane flat surface.

9. A computing apparatus as defined in claim 7 in which each of said selling price indicia lines extends obliquely upwardly and to the right from its point of origin to its terminus as seen if said chart were laid upon a plane flat surface.

10. A computing apparatus as defined in claim 7 in which each of said selling price indicia lines extends obliquely upwardly and to the right from its point of origin to its terminus as seen if said chart were laid upon a plane flat surface, and in which the said cost price data-bearing section of the said chart is arranged at the left-hand side of the said chart as the said chart is seen through the said sight opening.

11. A computing apparatus as defined in claim 7 in which each of said selling price indicia lines extends obliquely upwardly and to the right from its point of origin to its terminus as seen if said chart were laid upon a plane flat surface, and in which the said cost price data-bearing section of the said chart is arranged at the left-hand side of the said chart as the said chart is seen through the said sight opening, and in which the said percentage of profit based on cost price scale is arranged along the lower marginal edge of the said sight opening and in which the said percentage of profit based on selling price scale is arranged along the upper marginal edge of the said sight opening and while coextensive in length with the said percentage of profit based on cost price scale is equal numerically to only one-half of the said percentage of profit based on cost price scale.

RAYMOND A. NELSON.